Aug. 22, 1933.　　　　C. SANDS　　　　1,923,460
DISTRIBUTING DEVICE FOR PNEUMATIC ELEVATORS
Filed Nov. 2, 1932　　2 Sheets-Sheet 1

Inventor
Charles Sands
By his Attorneys

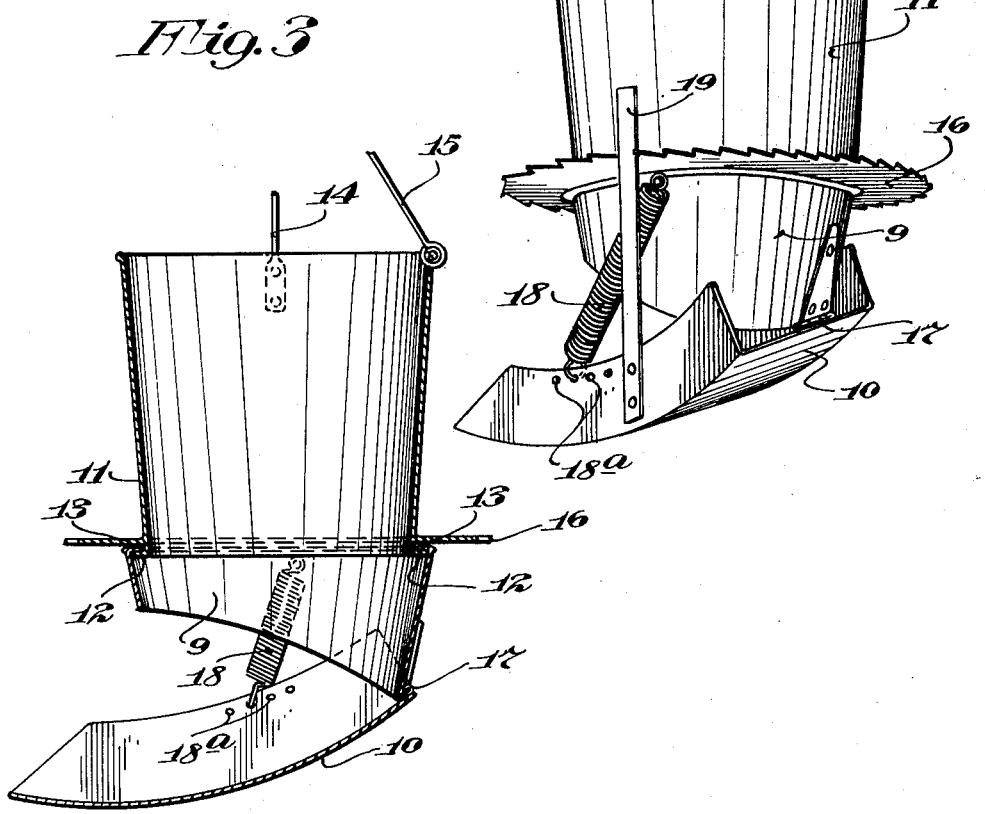

Patented Aug. 22, 1933

1,923,460

UNITED STATES PATENT OFFICE 1,923,460

DISTRIBUTING DEVICE FOR PNEUMATIC ELEVATORS

Charles Sands, Kenyon, Minn.

Application November 2, 1932. Serial No. 640,765

6 Claims. (Cl. 302—60)

My invention primarily is directed to the provision of a simple and highly efficient ensilage distributor but is capable of more general use for the distribution of grain or other material that is adapted to be delivered into bins or the like by pneumatic elevators or similar elevating mechanism.

In the delivery of ensilage from an ensilage cutter, through a pneumatic elevator, the flow or discharge is always intermittent due partly to the action of the air blast but chiefly to the fact that the stock is fed to the ensilage cutter intermittently, as by successive pitchings. In my invention, I take advantage of this intermittent flow and discharge of the ensilage or other material.

Generally stated, the invention consists of the novel devices, combinations of devices and arrangement of parts hereinafter described and defined in the claims.

In the accompanying drawings, which illustrate a commercial form of the invention, like characters indicate like parts throughout the several views.

Referring to the drawings:

Fig. 2 is a perspective view showing the complete device applied to the delivery end of the tube of a pneumatic elevator; and Fig. 3 is a section taken on the line 3—3 of Fig. 1.

Figure 1:
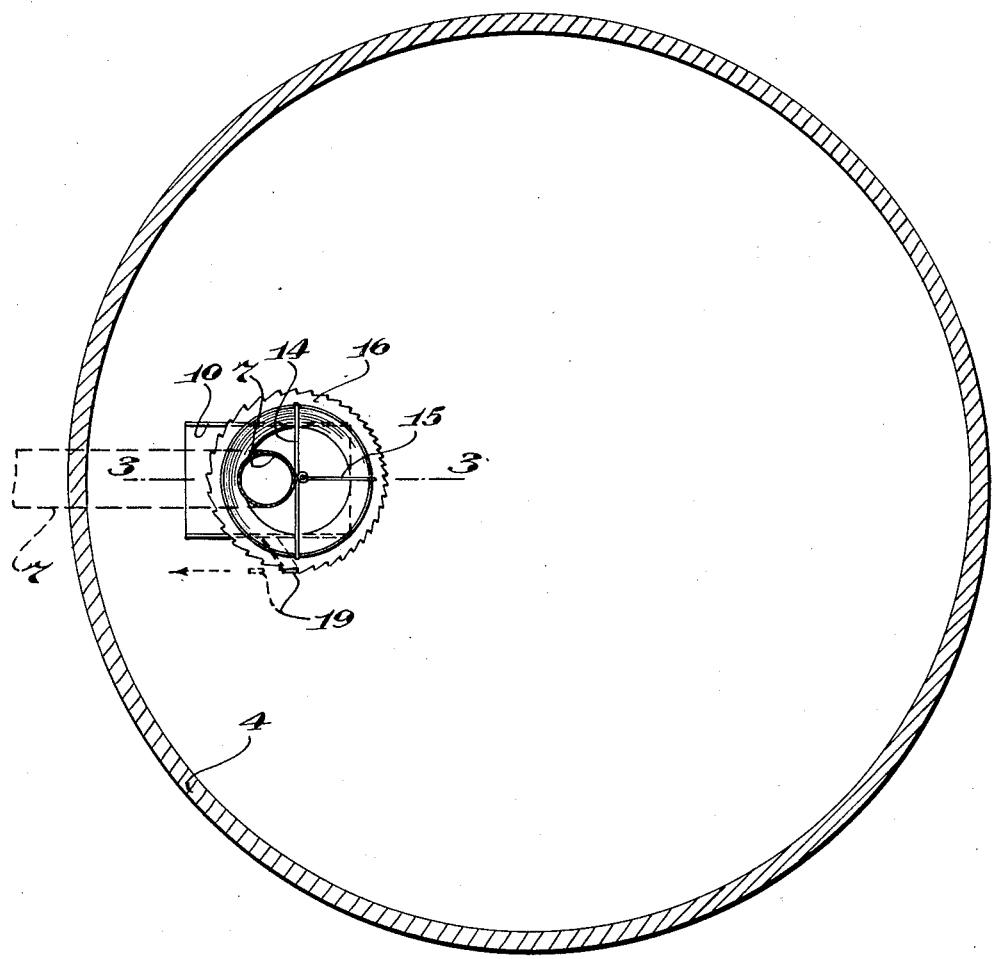
Fig. 1 is a horizontal section taken through a cylindrical silo and showing the distributor in plan view.

The wall of the silo is indicated by the numeral 4 and its roof by the numeral 5. It is customary to provide the roof with an opening 6 located relatively close to one side of the silo. The numeral 7 indicates the delivery end portion of the tube of a pneumatic elevator, the same being extended into the silo through the opening 6. This tube is shown as provided with a hook 8 for the support of a distributor. The distributor proper comprises an annular distributor head 9 and a depressible spout 10. The distributor head 9 is rotatably mounted on the lower end of a hopper 11 which, as shown, is much in the form of a metallic pail, the bottom of which is removed or omitted; and in this particular arrangement, the said hopper 11 is provided at its lower end with an outturned annular flange 12 and the annular distributor head 9 is provided with an inturned annular flange 13, that overlaps said flange 12 and thereby supports the head for free rotation. The hopper 11 is shown as provided with a rigid bail 14 that is hung on the hook 8 to support the hopper immediately below the discharge end of the spout 7. The numeral 15 indicates a stabilizing rod hung on the hook 8 and pivotally connected to the flanged upper edge of the hopper 11.

The hopper 11, at its lower portion just above its flange 12, is provided with an outstanding ratchet toothed flange 16. The distributing spout 10, which is preferably a curved open top structure is connected to the annular distributing head 9 by a pivot or hinge 17. A coiled spring 18 is anchored at its upper end to one side of the rotary distributor head 9 and at its lower end is detachably connected in one or the other of several perforations 18ª formed in one flange of the spout 10. By varying the connection of the spring 18 through the different perforations 18ª, the force with which the spring will hold the spout 8 against depression, may be varied.

Broadly considered, I can employ various different kinds of means whereby successive depressions of the spout 10 will cause rotation of the distributor; but as an extremely simple and most efficient means for accomplishing this purpose, the ratchet toothed flange 16 above described is employed in connection with a pawl-acting ratchet bar 19 that is rigidly secured to one side of the depressible spout 10 and is engageable with the teeth of said ratchet flange by movement in a plane or on a line that is substantially tangential to the toothed arc of the flange. This line of movement is important for the reason that regardless of the extent of movement of the spout and of the pawl-acting ratchet bar, only one tooth will be engaged for each depression and return movement of the spout.

If it were convenient in general practice to locate the hopper of the distributor at the axis of the silo or bin, then the teeth on the ratchet flange 16 or corresponding controlling element should be of constant circumferential length throughout. However, it is the common practice to provide the opening in the roof of a silo near one side of the silo, substantially as shown in the drawings, and inasmuch as this will position the distributor relatively close to one side of the silo, it becomes important that the distributor should hesitate or move more slowly while discharging into the bin at points progressively farther and farther from the axis of the hopper and distributor, so as to cause a discharge of the greatest amount of ensilage or material toward the far side of the bin. This I accomplish in an extremely simple manner, simply by making the teeth of the ratchet flange 16 progressively shorter in both directions away from that side or point of the hopper that is to be hung closest to the wall of the silo, see particularly Fig. 1.

The operation is probably clear from the foregoing, but attention is again called to the fact that each time there is a discharge of a quantity an ensilage onto the distributing spout, it will be depressed, thereby retracting the ratchet bar 19 and as soon as the load is discharged or lightened to a material extent from the spout, spring 18 will lift the spout back to normal or raised position, thereby causing ratchet bar 19 to engage a tooth of the non-rotary ratchet flange 16, with the obvious result that the distributor including the annular head 9 and spout will be given one step of rotary movement in a clockwise direction in respect to Fig. 1.

From the foregoing it is evident that various alterations and changes in the details of construction and arrangement may be made within the spirit of the invention herein disclosed and broadly claimed. The device described has been put into actual use and found highly efficient for the purposes and in view. In fact, this device has displaced the necessity for two men working in the bin for the distribution of ensilage delivered thereinto from a pneumatic elevator.

What I claim is:

1. In a device of the class described, a hopper, a distributor rotatably mounted at the bottom of said hopper and provided with a yieldingly supported depressible discharge element, combined with means whereby successive depressions of the latter will progressively rotate said distributor.

2. In a device of the class described, the combination with a hopper, of an annular distributor head rotatably mounted on said hopper, a distributing spout hingedly connected to said head and rotatable therewith, a yielding connection between said head and spout supporting the latter with freedom for depression under the discharge of material from said hopper, and a pawl and ratchet connection between said hopper and spout whereby said head and spout will be progressively rotated under intermittent discharge of material from said hopper onto said spout.

3. In a device of the class described, the combination with a hopper having an outstanding ratchet flange, of an annular distributor head rotatably mounted on the lower portion of said hopper, a distributing spout hingedly connected to said head, a spring connection between said head and spout, yieldingly supporting the latter, and a pawl-acting ratchet bar connected to and actuated by said spout and engageable with the teeth of said ratchet flange by movement on a line substantially tangential to the toothed arc of said ratchet flange.

4. The structure defined in claim 3 in which said ratchet bar is directly and rigidly connected to one side of said spout.

5. The structure defined in claim 2 in which said pawl and ratchet connection includes a ratchet toothed annular flange secured to and projecting from said hopper, and a cooperating pawl-acting member connected to and operated by said spout.

6. The structure defined in claim 2 in which said pawl and ratchet connection includes a ratchet toothed annular flange secured to and projecting from said hopper, and a cooperating pawl-acting member connected to and operated by said spout, the teeth of said ratchet flange being progressively increased in length throughout one-half of the circumference of said flange and progressively decreased throughout the other half of the circumference of said flange.

CHARLES SANDS.